Figure 5:
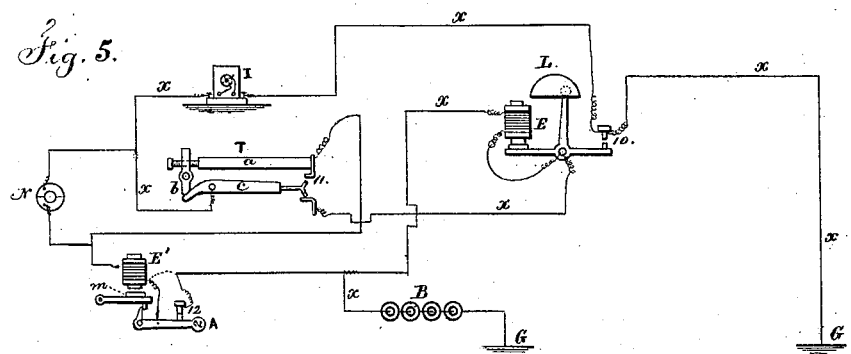

4 Sheets—Sheet 1.
J. H. GUEST.
DISTRICT FIRE-ALARM TELEGRAPHS.
No. 193,650. Patented July 31, 1877.
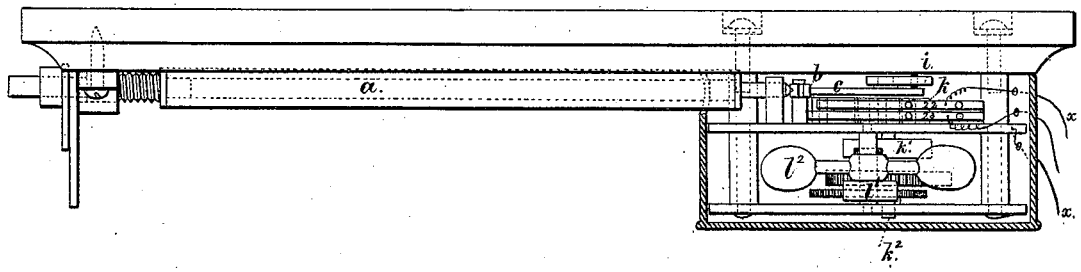
Fig. 8.
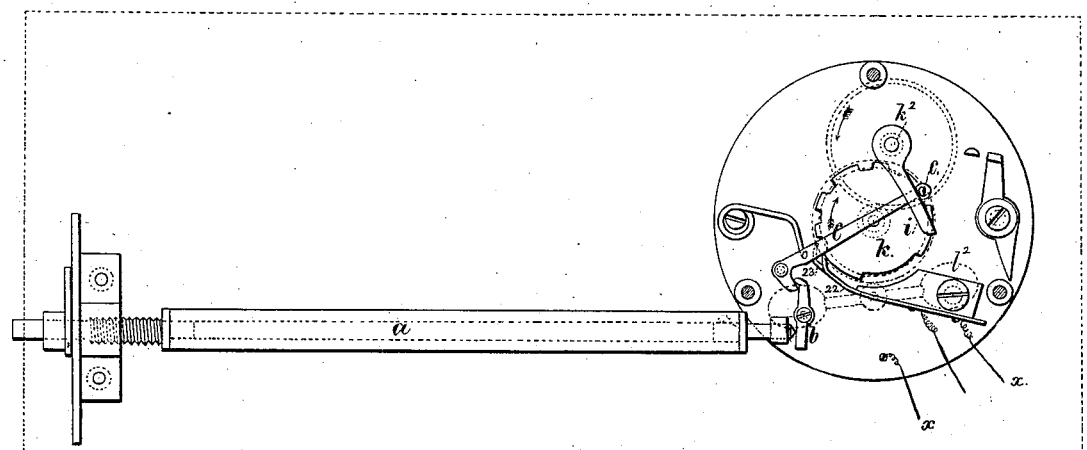
Fig. 9.
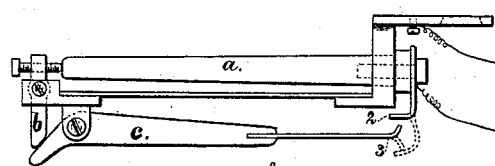
Fig. 1.
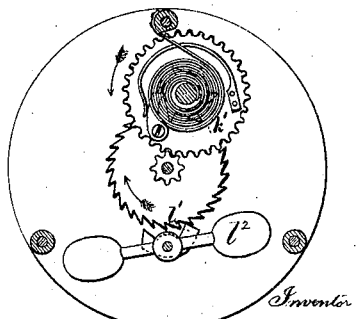
Fig. 10.
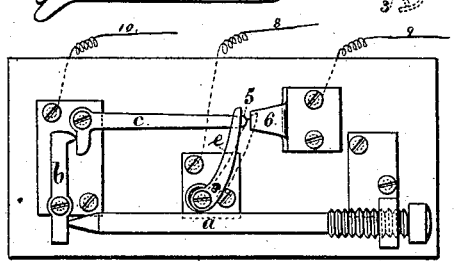
Fig. 2.
Fig. 2.ª
Witnesses,
Chas. H. Smith
Geo. T. Pinckney
Inventor
John H. Guest
per L. W. Serrell
atty J. H. GUEST.
DISTRICT FIRE-ALARM TELEGRAPHS.
No. 193,650. Patented July 31, 1877.
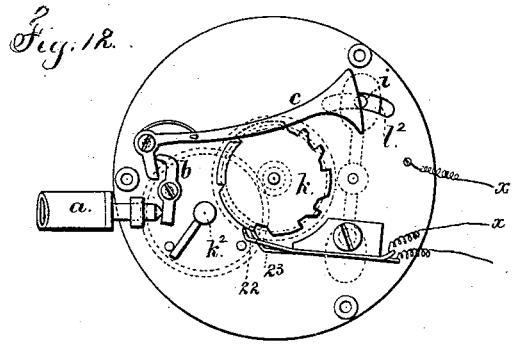
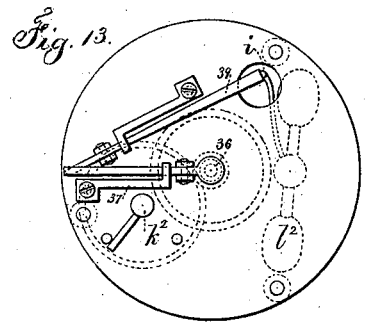
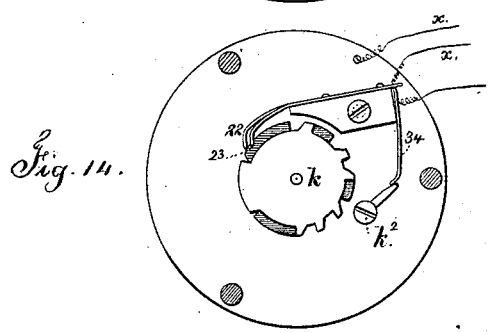
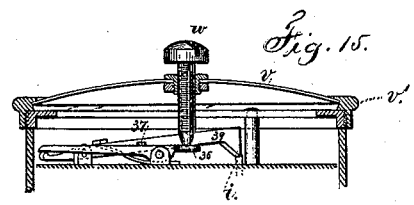
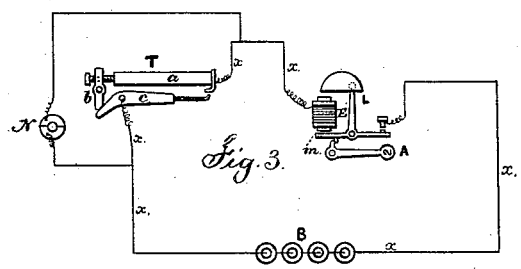
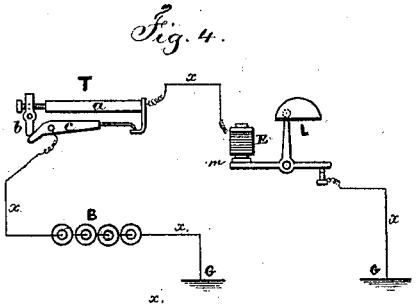
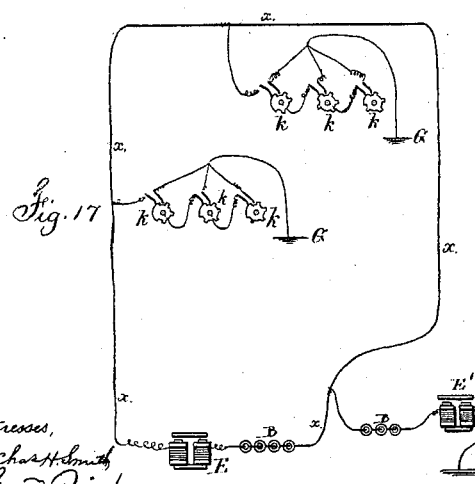
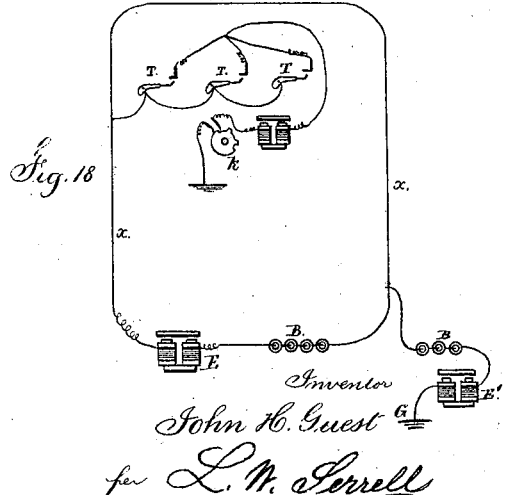
Witnesses,
Chas. H. Smith
Geo. T. Pinckney
Inventor
John H. Guest
per L. W. Serrell
atty.

4 Sheets—Sheet 3.

J. H. GUEST.
DISTRICT FIRE-ALARM TELEGRAPHS.

No. 193,650. Patented July 31, 1877.

Witnesses,
Chas. H. Smith
Geo. T. Pinckney

Inventor
John H. Guest
per L. W. Serrell
atty

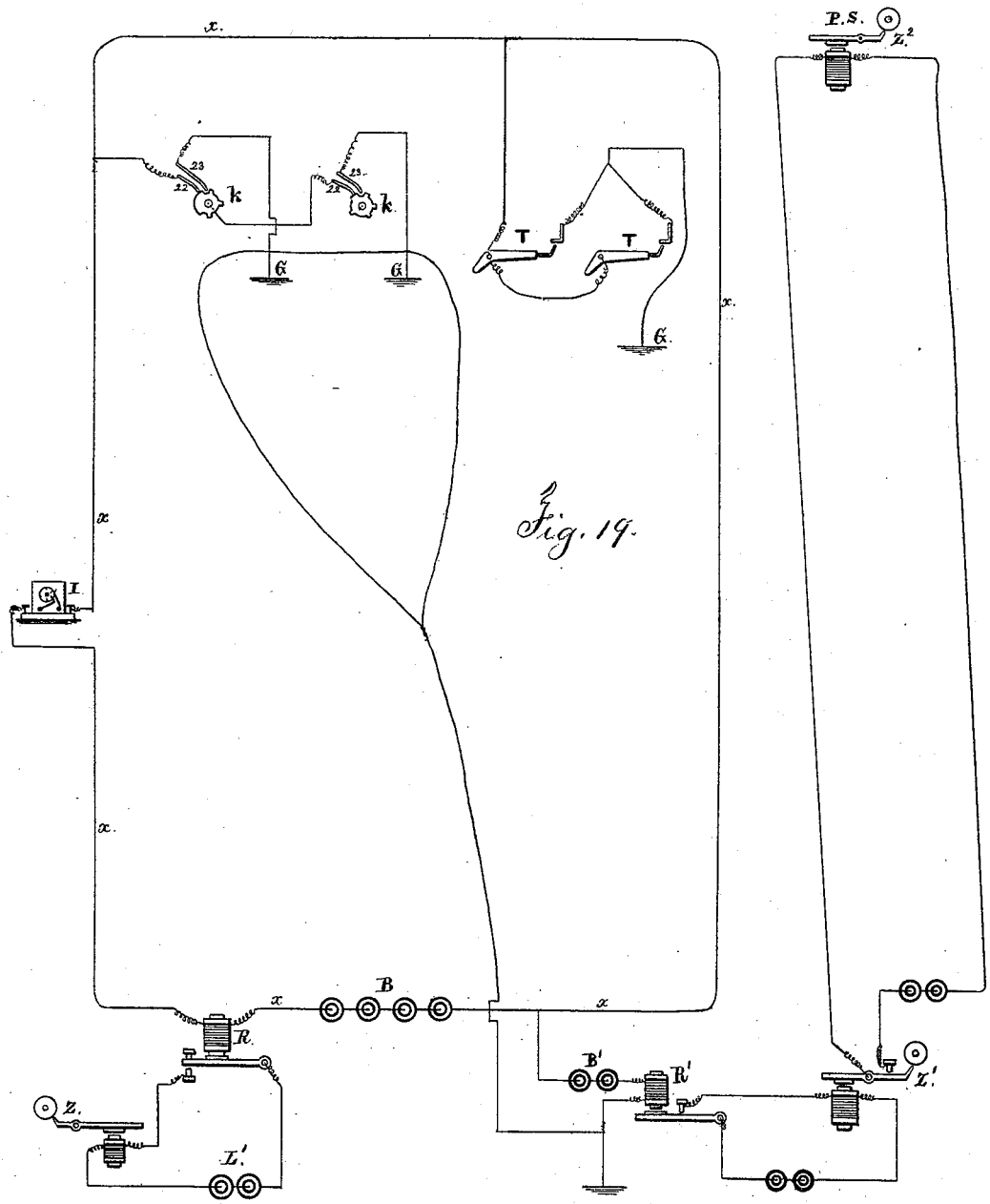

UNITED STATES PATENT OFFICE.

JOHN H. GUEST, OF BROOKLYN, NEW YORK.

IMPROVEMENT IN DISTRICT AND FIRE ALARM TELEGRAPHS.

Specification forming part of Letters Patent No. 193,650, dated July 31, 1877; application filed December 29, 1876.

*To all whom it may concern:*

Be it known that I, JOHN H. GUEST, of Brooklyn, in the county of Kings and State of New York, have invented an Improvement in District and Fire Alarm Telegraphs, of which the following is a specification:

This invention is an improvement upon that for which Letters Patent were granted to me May 5, 1874, No. 150,566; and consists in an arrangement of circuit-connections, and in the peculiarity of the instruments employed therein, whereby the expansion of the hard rubber or similar non-metallic solid is made to change the circuit-connections and give an alarm.

The elevation, Figure 1, and side view, Fig. 2, illustrate two instruments, in which the expansion of the rubber rod $a$ is made to act through the levers $b$ and $c$ to open or close the circuit-connections. In Fig. 1 these circuit-connections will be closed between 2 and 3 by the expansion of the rod $a$ by increase of temperature. If the parts are in the form indicated by dotted lines, the expansion of $a$ will separate 2 and 3 and break the circuit. The screw adjustment at the end of the rubber rod $a$ regulates the position of the parts so that the circuit is opened or closed when a defined temperature is reached.

In Figs. 2 and Figs. 2ª the hooked end 5 of the lever $c$ prevents the spring-arm $e$ moving toward the contact-block 6 until the hooked end 5 is forced upwardly from behind the spring-arm $e$, liberating the same, so that it immediately closes the circuit through 8 and 9, and breaks it between 10 and 8.

The manner in which these instruments can be used in circuits, either alone or in connection with district-alarm-telegraph instruments of the general character of those patented June 11, 1872, and July 16, 1872, to Edward A. Calahan, or in connection with a hotel-annunciator, will be apparent on reference to the diagrams, Figs. 3, 4, 5, 6, and 7.

In these diagrams the parts marked B represent the battery; G, the ground-connection; I, the district-telegraph-alarm instrument, operated by hand, to indicate "messenger," "police," or other call, as in said Calahan patent; T, the thermostat, like that in Fig. 1; and where an annunciator is represented, it is marked A, and $x$ is the main circuit.

This annunciator may be of any desired character; but it is shown with a swinging tag, 2, on a bent lever, that is moved up by hand; but it swings down when the armature $m$ is attracted by the magnet E or E', and liberates the arm of the swinging tag.

L represents an alarm-bell, rung by the electro-magnet E, or by clock-work liberated by that magnet E.

The number of alarm-instruments I, thermostats T, annunciators A, and bells L may be increased to any desired extent, the circuit-wires being extended to include them. The number shown in the diagram is limited for greater clearness.

At the central station the battery B is located, also one or more receiving or indicating instruments, $s$ or $s'$, which may be dials, Morse registers, bells, or other devices, adapted especially to indicate numbers by dots, thus, — — — — — standing for 1 2 3, and so on, the attendant being provided with a table indicating the location of the instrument that is fitted to send that number, and what this signal signifies, and a pre-arranged arbitrary mark or signal may be employed to denote whether the signal sent is from a thermostat or district or other alarm instrument.

The electric circuits may be composed entirely of insulated wires, or partially of ground-connections, or of two insulated wire-circuits, as hereinafter illustrated.

In the diagram, Fig. 3, the thermostat T is in a metallic circuit adapted to a hotel, the switch or press button at N being employed for the usual call to a room, and operating to close the circuit, ring the bell L, and drop the annunciator-tag A.

If the thermostat expands by excess of heat it closes the circuit automatically, producing the same call, and the bell will continue to ring while the circuit is closed, the act of moving the armature breaking the circuit to the magnet, as heretofore usual in alarms.

In Fig. 4 the thermostat T is shown in the normal position as closing the circuit, and as breaking it when the rod $a$ expands, the hammer striking the bell as the armature recedes.

Fig. 5 shows a district-alarm instrument, I, in the circuit, adapted to give a signal by taps on the bell L at the central office when the instrument I is operated or started by hand; but any other indicator may be used in place of the bell L. The thermostat T is in the main-line circuit $x$, and closes the same in the usual manner. When the rod $a$ expands the circuit $x$ is broken, which demagnetizes E, the armature falls and closes the circuit $x$ at 10, the armature is attracted, and the circuit again broken at 10. Thus the thermostat causes the bell to continue to ring until the circuit at T is again closed.

If this instrument is used with a switch or press-button at N to close the circuit at a room, then the annunciator A will be operated, the magnet E' being charged by closing the circuit at N. By making the connections, as shown, the continued expansion of the thermostat will close the circuit through 11 and E' to the battery, and in the fall of the annunciator-tag 2 that circuit might be broken at 12; but if the connection remained, as indicated by dotted lines, the magnets E' and E will be operated alternately if the magnet E' offers more resistance than the magnet E.

Figure 6:
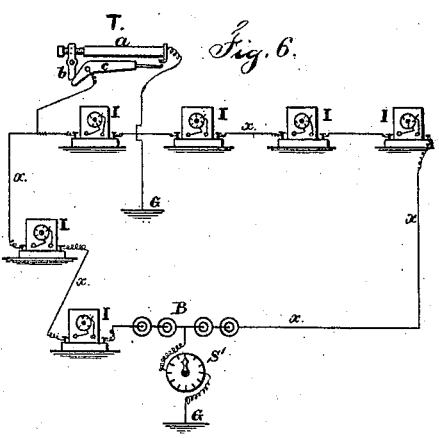

Fig. 6 illustrates a circuit with a number of district-alarm instruments, I, and shows how a main circuit, $x$, can be connected by a wire to a thermostat, T, at any point, either near or remote, and the signal given by short-circuiting the current through the ground to the instrument $s'$ at the central station if the thermostat closes that branch circuit to the ground.

Figure 7:
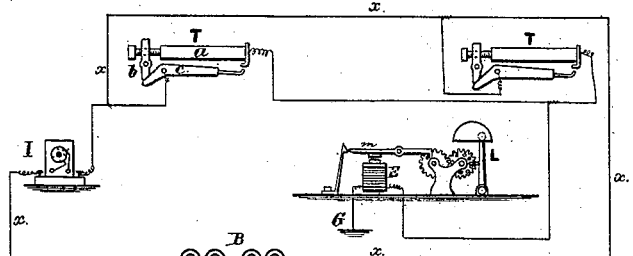

Fig. 7 illustrates how two or more thermostats, T, can be connected from the main circuit $x$ by branch wires to a magnet, E, the armature of which forms a stop for clock-work, so that when the thermostat closes the branch circuit the armature is attracted and held by a spring-catch, and the clock-work will ring an alarm-bell. The circuit to E will be closed by the expansion of either thermostat, and short-circuit the current through E without breaking the continuity of the main circuit $x$.

The thermostat mechanism (shown in Figs. 8, 9, and 10) consists of a circuit-wheel, $k$, insulated circuit-closing springs 22 and 23, an actuating-spring, $k^1$, with an arm, $i$, upon the arbor of the spring-barrel or other arbor, so that when this arm is turned back by a key applied to the arbor $k^2$ the spring is partly wound and held by the arm or dog $c$. When the arm $c$ is swung back by the expansion of the rod $a$, acting through the lever $b$, the arm $i$ is liberated, and the spring turns that arm and the wheel $k$. An escapement, $l^1$, and pendulum or vibrator $l^2$ limit the rapidity of movement, so that the circuit-wheel $k$ makes and breaks the electric circuit to give the required indicating-pulsations to represent numbers, letters, or other characters at the central station. This circuit-wheel $k$ is made with notches in its periphery, or with conducting and non-conducting material, so that as it revolves it makes and breaks contact with the ends of the springs 22 and 23, and produces pulsations in the circuit, and the notches are positioned to give the prearranged signal to indicate at the central office what thermostat-instrument is operative.

Figure 11:
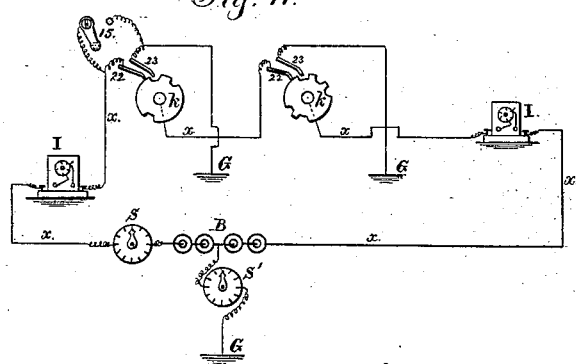

In Fig. 11 the circuits are represented with special reference to the instrument shown in Figs. 8, 9, and 10. The wheel $k$ has the notches to give the signals, and the springs 22 and 23 are insulated. The line-wires $x$ connect with 22, and the body of the clock-work and the springs 23 are connected to earth G. The spring 22 in the normal position is in contact with $k$, but the spring 23 is not; hence the line $x$ is complete through 22 and $k$ and the frame of the machine, and any number of these instruments can be placed in the circuit, together with the district-instrument I.

If the wheel $k$ is turned in consequence of the thermostat liberating the clock-work that revolves the same, the springs 22 and 23, when both resting simultaneously on the edge of the wheel $k$, short-circuit the current to earth, producing pulsations that are received and recorded on the instrument $s'$ at the central station; hence the operation of the thermostats would not be prevented if the line was cut or broken at any one place, as the earth-connection is in the middle of the battery, and by use of a switch at 15 the instrument I could be brought into action even with the main line cut or broken, the circuit passing through the earth and the signal being received at $s'$.

In Fig. 12 the circuit-wheel $k$ is revolved as before, but the escapement-vibrator $l^2$ is held by a lever-arm, $c$, until the expansion of the hard-rubber rod $a$, acting upon the lever $b$ and arm $c$, moves the latter out of the way of the pin $i$ upon $l^2$, and allows the escapement to vibrate and the pulsations to be sent through 22 and 23, as before mentioned. The arm $k^2$ forms a stop to the winding-arbor, so as to determine the point at which the wheel $k$ will be arrested, and in Fig. 14 this stop $k^2$ is represented as in contact with spring 34, extending from the base of the spring circuit-closers 22, so that the circuit will be reliably closed through this spring 34 and the clock-work when the machine is wound and at rest; but this arm of $k^2$ separates from 34 when the clock-work commences to move, so that the wheel $k$ will give the correct pulsations and signals.

This connection prevents risk of the circuit being broken by oil or dirt upon the arbor of the wheel $k$, and it may be used with either of the instruments in which this wheel $k$ is employed.

Fig. 15 is a section, and Fig. 13 a plan view, of another form of alarm mechanism, which may be used with my peculiar arrangements of circuits.

The disk $v$, of hard rubber or other non-metallic solid, is sustained at its edge in a ring, $v'$, and receives an adjusting-screw, $w$, at or near the center. This presses upon the lever 36, and prevents the spring 37 thereof moving said lever; but when the convex disk $v$ expands, the center thereof and the screw $w$ are raised, and the spring 37 acts upon the lever 36 to press down one end of the lever 39 and raise the other end, liberating the stop-finger $i$ of the vibrator or escapement, and allowing the clock-work to run and revolve the circuit-wheel $k$, or give a signal or alarm in any other convenient manner.

By adjusting the screw $w$ the thermostatic alarm can be made to operate at any desired temperature.

Figure 16:
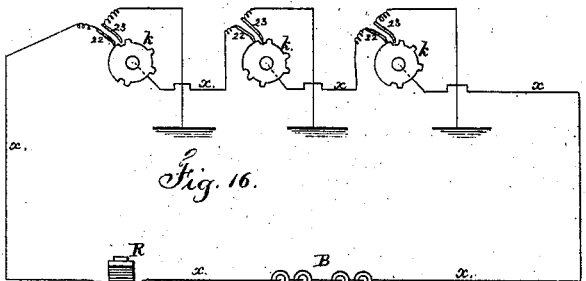

Fig. 16 represents circuit-connections with thermostats and a Morse receiver at $z$, the object being to operate the relay-magnet R of the main circuit $x$ at the central station by either circuit-wheel $k$, and by relay open and close the local circuit of the battery L′, and indicate the signal upon the receiver $z$. If, however, the main-line circuit $x$ is broken or cut, and the pulsations from either thermostat-instrument pass through the earth, the second relay-magnet R′ will be operated. The armature of R′ is also connected in the local circuit, so that when the switch 15 is changed the relay R′ will operate the receiver $z$, and make the same character of mark as is made by the relay R.

By this arrangement the relay R can be used with district-alarm or with the thermostat instruments in a metallic circuit, and operate a Morse receiver, and when the current is sent through the earth in consequence of the main circuit $x$ being broken at any one point, the circuit will be closed by 22, 23 resting simultaneously on $k$, and hence the relay R′ is arranged to close the local circuit on the front stroke of the armature, in order that the same character of mark may be made in the receiver $z$ by the local circuit through R′ as when the local is closed by the relay R in the back stroke.

In Fig. 17 a metallic circuit is shown that may contain district-alarm instruments, a battery, and a sounder, E, and this sounder will usually be charged, and if the main-line circuit is broken the sounder will indicate the same by the armature falling back, and the sounder may be connected, as in Fig. 5, to ring an alarm when the main-line circuit is broken.

Into this main-line circuit one or more branches may be connected, as represented, each provided with the thermostatically-controlled signal-boxes described for operating such branches. I have represented two branch circuits with three thermostats in each, and an earth-connection by which I illustrate branches to two buildings, and three thermostats in each. When either of the thermostats operates, the signal is received at the call or sounder E′ in the branch circuit at the central station leading to the earth. It is generally preferable to place a battery in this earth-branch.

By this arrangement the thermostats will give a signal without interfering with the circuit in which the district-alarm instruments are placed.

In Fig. 18 a similar arrangement of circuits is illustrated to that in Fig. 17, except that the thermostats are of the character shown in Fig. 1, and in order to indicate at the receiving-station the number of the place from which the signal is sent I lead the ground-connection first through a magnet that liberates the clock-work that revolves the circuit-wheel $k$.

In Fig. 19 the main circuit $x$ contains district-alarm or similar instruments I, operated by the battery B, and in this circuit is a relay-magnet, R, operating the local circuit and register $z$.

From the main line $x$ there are branch circuits and thermostats T or $k$, as in Fig. 17 or 18, and these connect through the ground or a separate line to the relay R′ and battery B′, and the relay R′ operates the local circuit and receiving-instrument $z^1$, which, of course, will only respond to the thermostats.

At P S is a fire-patrol station or engine-house, with a receiving or indicating instrument, $z^2$, and there is a battery in this circuit, and it is opened or closed by circuit-closing points at the armature of the receiving-instrument $z^1$, or by a second set of circuit-closing points on R′, or the instruments $z^1$ $z^2$ may be in one circuit; thereby the fire-alarm indication is given at the engine-house or patrol-station, as well as at the central station.

I claim as my invention—

1. The expansion-rod $a$ and circuit-closing lever $c$, arranged side by side with the intermediate lever $b$ at one end, and the circuit-closing points at the other end, for the purposes and as set forth.

2. The circuit-closing wheel $k$ and actuating mechanism, substantially as set forth, in combination with the thermostat and intermediate levers, that liberate the mechanism by the expansion of the thermostat, substantially as set forth.

3. An electric circuit containing thermostats with closed circuits and the magnet of a bell or sounder, and a circuit-breaker operated by the bell or sounder, the circuits being arranged substantially as shown in Fig. 5, so that the bell is made to ring while the thermostat-circuit is broken, as set forth.

4. The combination, with a circuit containing district alarm or other signaling instruments, of a branch circuit containing a thermostat, an earth-connection, and a relay from one station to a patrol or second station, whereby the signals are given at the second station from the thermostats only, substantially as set forth.

5. The combination of the wheel $k$, springs 22, 23, and 34 with the circuit-closing arm on the arbor $k^2$, for the purposes set forth.

6. A relay-magnet in the main circuit and a relay-magnet in the earth-circuit at the central station, and a registering-instrument in a local circuit connected with both the relays, in combination with a thermostat break-wheel in a branch circuit from the main line, substantially as set forth.

7. A circuit containing district-alarm-telegraph instruments, battery, and indicating-instrument at the central station, and thermostat alarm-instruments in branch circuits from the main circuit, in combination with a relay-circuit to an indicator at the fire-patrol station, operated by the thermostats, and not by the district-alarm instrument, substantially as set forth.

Signed by me this 9th day of July, A. D. 1874.

J. H. GUEST.

Witnesses:
 GEO. T. PINCKNEY,
 CHAS. H. SMITH.